United States Patent
Bakke

(10) Patent No.: US 11,144,268 B2
(45) Date of Patent: Oct. 12, 2021

(54) TIMING SYNCHRONIZATION IN A DISPLAY-SERVER COMPUTING SYSTEM AND METHOD

(71) Applicant: Netzyn, Inc., Dallas, TX (US)

(72) Inventor: Steve Bakke, Dallas, TX (US)

(73) Assignee: Netzyn, Inc.

(*) Notice: Subject to any disclaimer, the term of this patent is extended or adjusted under 35 U.S.C. 154(b) by 0 days.

(21) Appl. No.: 16/708,184

(22) Filed: Dec. 9, 2019

(65) Prior Publication Data

US 2020/0192619 A1   Jun. 18, 2020

Related U.S. Application Data

(60) Provisional application No. 62/777,292, filed on Dec. 10, 2018.

(51) Int. Cl.
*G09G 3/30*       (2006.01)
*G09G 3/36*       (2006.01)
*G06F 3/14*       (2006.01)
*H04L 29/08*      (2006.01)

(52) U.S. Cl.
CPC ............ *G06F 3/14* (2013.01); *H04L 67/12* (2013.01)

(58) Field of Classification Search
CPC .......... G06F 2213/3814; G06F 3/1269; G06F 3/14–3/1475; G06F 3/3618; G09G 2370/02–2370/027; G06G 5/12; G06G 5/18

See application file for complete search history.

(56) References Cited

U.S. PATENT DOCUMENTS

| | | | |
|---|---|---|---|
| 2014/0143297 A1* | 5/2014 | Ibarria | H04L 47/25 709/203 |
| 2017/0075432 A1* | 3/2017 | Verbeure | G09G 5/08 |
| 2019/0164518 A1* | 5/2019 | Dimitrov | G02B 27/017 |

* cited by examiner

*Primary Examiner* — Sanghyuk Park
(74) *Attorney, Agent, or Firm* — The Law Firm of H. Dale Langley, Jr. P.C.

(57) ABSTRACT

A system includes a server computer, an application unit of the server computer, a user device communicatively connected to the server computer, a synchronizing frame rate generator of the user device, and a synchronizing frame rate generator of the server computer. The user device sends the server computer an event signal at a precise time, the server computer processes the application unit with the event signal as input, and the server computer returns processed data to the user device. The processed data arrives at the user device at a correct time to be immediately displayed.

14 Claims, 4 Drawing Sheets

TIMING SYNCHRONIZATION IN A DISPLAY-SERVER COMPUTING SYSTEM AND METHOD

TECHNICAL FIELD

The present invention generally relates to computing systems and more specifically relates to display-server systems and communications networks.

BACKGROUND

End-user computing software programs and their operations (i.e., applications) have traditionally been processed (i.e., run) on an end-user device itself, for example, a personal computer (PC) running an application of the PC, a smartphone running an application on the smartphone, a game console running a game application on the console, and others.

A different approach is to run end-user applications on data center-located servers. These server-run applications are delivered to the end-user device via communicative connection of the end-user display device to the servers. Such a display-server system is described for non-exclusive example in U.S. Pat. No. 8,700,713.

When the application is run on the remote server versus run on the end-user device a certain amount of lag exists between the user performing an operation and the display being updated. Much of this lag is the communications network latency between the server and display device.

It would be a significant improvement in the art and technology to provide for an application run on a remote server to render in a user display or a user device a timely representation of the state of the application. It would further be a significant improvement in the art and technology to reduce render latency in a display-server computing system. Even more, it would be a significant improvement in the art and technology to provide systems and methods that cause an application processed by a server to appear in a user display as though processed instead on the end-user device.

SUMMARY

An embodiment of the invention is a system. The system includes a server computer, an application unit of the server computer, a user device communicatively connected to the server computer, a synchronizing frame rate generator of the user device, and a synchronizing frame rate generator of the server computer. The user device sends the server computer an event signal at a precise time, the server computer processes the application unit with the event signal as input, and the server computer returns processed data to the user device. The processed data arrives at the user device at a correct time to be immediately displayed.

Another embodiment of the invention is a method of operation of a display-server computing system. The method includes delivering input by a display device to a server computer over a communications network according to a delay unit of the display device, processing an application unit of the server computer with the input and timing of a synchronizing frame rate generator of the server computer, responsive to delivering input, outputting a result of the processing, delivering the result by the server computer to the display device over the communications network, receiving the result by the display device, and displaying the result substantially immediately at the correct time of a synchronizing frame rate generator of the display device.

BRIEF DESCRIPTION OF THE DRAWINGS

The present invention is illustrated by way of example and not limitation in the accompanying figures, in which like references indicate similar elements, and in which.

DETAILED DESCRIPTION

A non-exclusive embodiment is a system including a server computer, an application unit of the server computer, a user device communicatively connected to the server computer. The user device has a periodic display update clock commonly referred to as VSYNC. The server computer also has a display update clock VSYNC which is frequency locked to the user device display update clock VSYNC. The user device may receive somewhat continuous input events from a mouse or game controller. At a calculated delay offset (which may be an increment or decrement) from the user device VSYNC time, the user device sends the input event to the server computer. The server computer processes the input event and sends processed data back to the user device. The server computer will also use receipt of the input event to synchronize the server VSYNC for the delay offset, and will employ the synchronized server VSYNC per the delay offset in processing the input event. Processed data from the server is therefore received at a small amount of time before the clock of the user device VSYNC. At the appropriate time of clock of the user device VSYNC, the received processed data from the server will be displayed, with very little render time because of the delay offset placed in sending the events from the user device to the server. The device frame time period VSYNC and the server frame time VSYNC will be kept precisely in sync but will be phase shifted by delay offset according to the embodiment.

Figure 1:
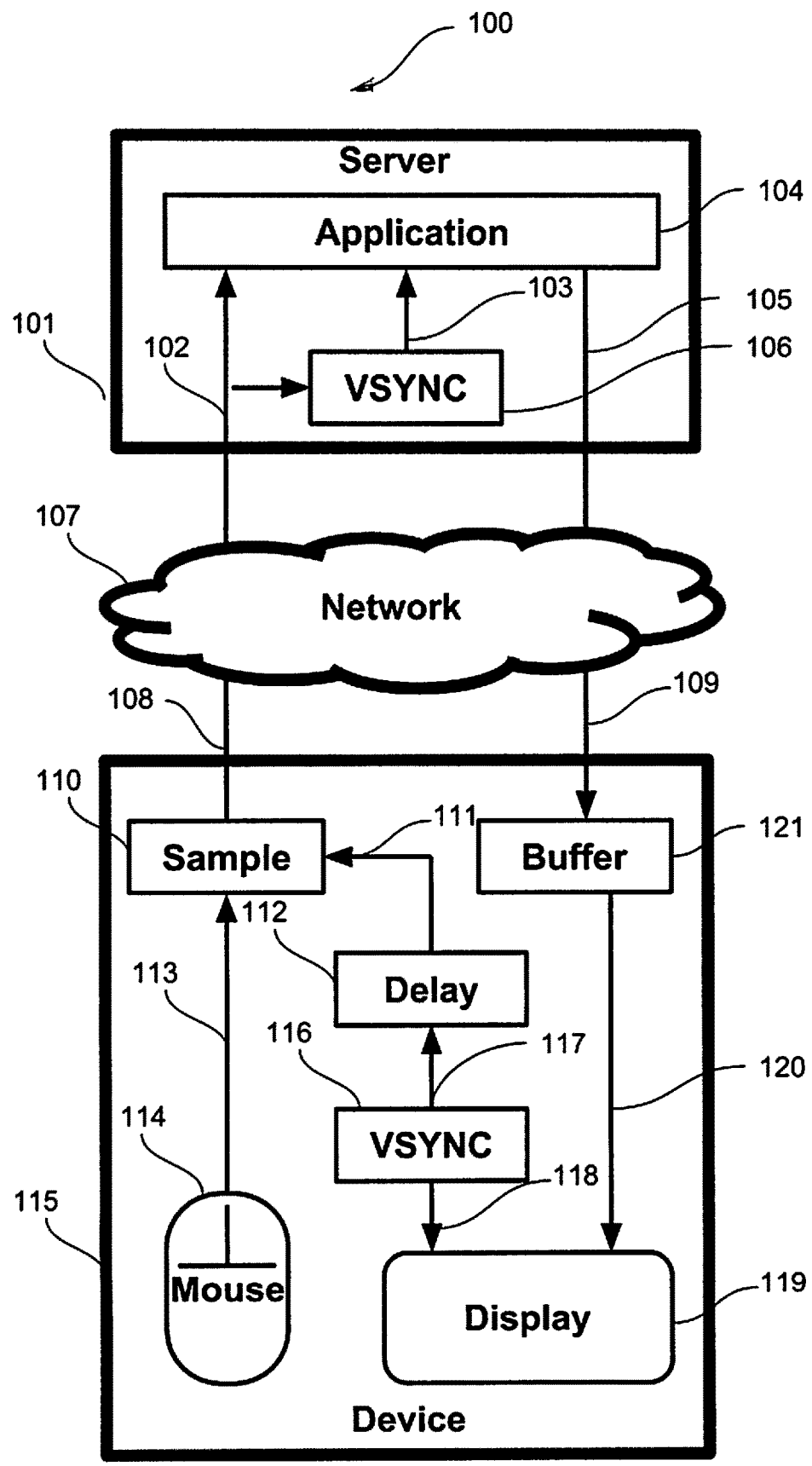
FIG. 1 illustrates a display-server system, according to certain embodiments of the invention.

Referring to FIG. 1, a non-exclusive example embodiment of a system 100 includes a processing device 101 processing an application unit 104. The application unit 104 is a circuit, a computer program in memory, combinations of these, and/or other elements. The application unit 104 outputs display data. The display data is transmitted over a network 107 communicatively connected to the processing device 101 to a user device 115 communicatively connected to the network 107. The user device 115 is a display or similar output device that operates with the display data, such as, for non-exclusive example, to depict on a display screen pixel images. The processing device 101 includes a VSYNC unit 106, a clock, that is frequency matched to corresponding VSYNC unit 116, another clock, of the user device 115.

A non-exclusive example of the processing device 101 is a server computer communicatively connected to a communications network 104. The server computer includes a processor, and processes the application unit 104 of or accessible to the server computer. The server computer may include one or more computer system including a processor, memory, and a system bus that couples system components, including the memory, to the processor. The memory may include a read only memory (ROM) and a random access memory (RAM). A basic input/output system (BIOS) containing the basic routines that help to transfer information between elements within the computer system is stored in the ROM. The server computer may also include a storage drive, and other readable and writable storage. The server computer may also include input peripheral device and output peripheral device. The storage drive, the other storage, and the peripheral devices are connected to the system bus by relevant interface. A number of modules can be stored in the memory, storage drive or other storage, including an operating system and the application unit 104. The server computer also includes a communication interface device for receiving and sending information over the communications network 107.

Although the processing device 101 is illustrated as a single device, the device could be a distributed computing system comprised of more than one server or computing device or otherwise. The processing device 101 may, for example, be a server computer that operates as a cloud server.

The user device 115 includes at least a sampler 110, a delay unit 112, an input device 114, and an output device, such as, for non-exclusive example, a display 119. The VSYNC unit 116 communicatively connects to the delay unit 112, and the delay unit 112 communicatively connects to the sampler 110. The VSYNC unit 116 also communicatively connects to the display 119 and operates as a periodic display update clock for the display 119. The user device 115 additionally includes a buffer 121 communicatively connected to the display 119. The user device 115 provides inputs communicated over the communications network 107 to the processing device 101 for operations of the application unit 104, and receives outputs of the application unit 104 over the network 107 from the processing device 101.

A non-exclusive example of the user device 115 is a display device communicatively connected to the communications network 107. The display device may include at least a processor, memory, mouse or other input device 114, and the output device or display 119. A system bus connects the memory, as well as the input device 114 and output display 119, to the processor. The display device also includes a communication interface device for sending and receiving information over the communications network 107.

The user device 115 may have limited or other processing capability. The user device 115 communicates over the network 107 with the processing device 101. The processing device 101 provides processing of the application unit 104 accessed for input by and output to the display 119 of the user device 115. The processing device 101 receives inputs to the user device 115, such as via the mouse 114 or otherwise, communicated over the network 107, and sends processed data from the application unit 104 to the user device 115, such as to the buffer 121, for output in the display 119.

The communications network 107 includes any wired or wireless telecommunications system by which networked devices, such as the processing device 101 and the user device 115, can exchange data. For example, the network 107 can include a local area network (LAN), a wide area network (WAN), an intranet, an Internet, or any combination.

In operation, the user device 115 includes the periodic display update clock VSYNC 116 for updating the display 119. The mouse 114 or other input device of the user device 115 can receive input to the user device 115 and cause the user device 115 to send stream of events 113. The sample 110 of the user device 115 samples those inputs of the mouse 114 (or other input device) at a time specified by an output 111 of the delay 112 of the user device 115. The delay 112 output 111 is time shifted output 117 of VSYNC 116. The input event 108, as per the time shift, then is transmitted by the user device 115 across the network 107. The event so transmitted then arrives 102 over the network 107 to the processing device 101. At the processing device 101, the arriving event 102 is delivered to the application unit 104 and also to the display update clock VSYNC unit 106 of the processing device 101. Output 103 of the VSYNC unit 106 is communicated to the application unit 104. The application unit 104 acts upon the input event 102 and the output 103 generated by the VSYNC unit 106 corresponding to the input event 102. The application unit 104 processes the input event 102 together with the output 103 and creates processed data 105 for transmission to the user device 115. The processed data 105 travels across the network 107 to the buffer 121 of the user device 115. Because of the calculated time shift of VSYNC 116 by the delay 112, processed data 109 arrives at an appropriate time and spends minimal time in the buffer 121. The processed data 109 is communicated from the buffer 121 as output 120 to the display 119. The VSYNC unit 116 output 118 therefore causes the display 119 to be updated for the buffer 121 output 120.

In use, render latency at the user device is reduced, because the processed data from the processing device is generated based on the user device delay and VSYNC of the processing device. The data transmitted by the processing device to the user device is time linked by virtue of the processing by the processing device, buffering in the buffer of the user device, and display in the user device according to VSYNC of the user device.

Figure 2:
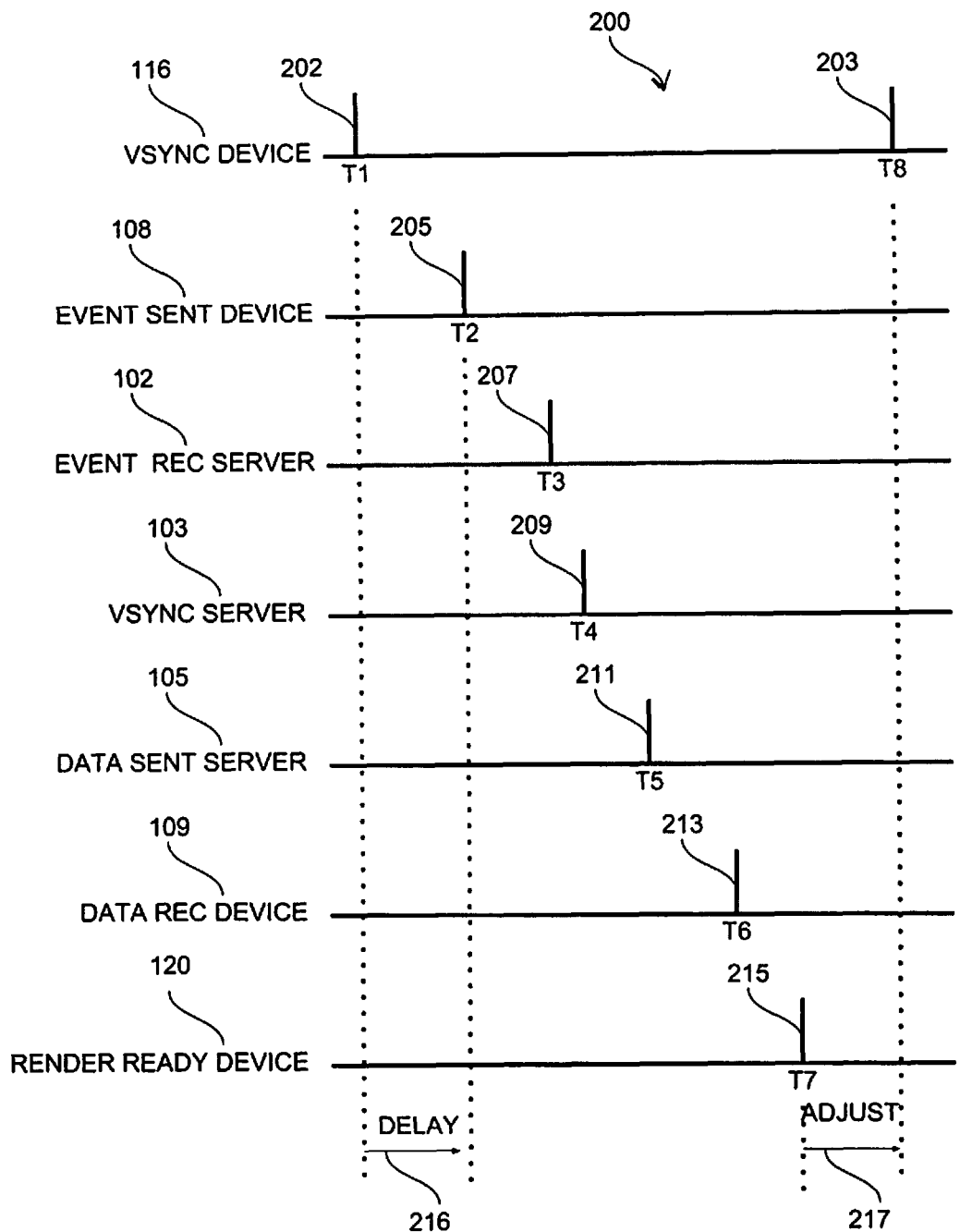
FIG. 2 illustrates timing of signals for a display and processing device (i.e., server), the display having delay offset calculations, the processing device having synchronized frame timing, according to certain embodiments of the invention.

Referring to FIG. 2, in conjunction with FIG. 1, a non-exclusive example of a timeline 200 for operations of a system for reducing render latency, such as, for non-exclusive example, the system 100 of FIG. 1, commences with output of the VSYNC unit 116 to the display and the delay 216 at time T1 202, and then (as periodically thereafter) again at time T8 203. At the calculated output 111 of the delay 112 indicated as 216 (in FIG. 2) after time T1 202, an input event of the input device 114 is sampled by the sampler 110 and is transmitted as output 108 of the user device 115 at time T2 205. The output 108 travels across the network 107 to the processing device 101 as input 102, and arrives at the processing device 101 at time T3 207. The VSYNC unit 106 of the processing device 101 employs the received input 102 to create output 103 of the VSYNC unit 106 at time T4 209. The output 103 is communicated to the application unit 104 of the processing device 101, and the application unit 104 processes and outputs processed data 105 at time T5 211. The processed data 105 is communicated by the processing device 101 over the network 107 to the user device 115 as input 109 to the user device 115, arriving at time T6 213. The processed data 109 so received is saved in the buffer 121, and the output 120 of the buffer 121 is available for display in the display 119 of the user device 115 at time T7 215. Calculation of the delay by the delay 112 of the user device 115 is defined so that output 120 of the buffer 121 is rendered (or ready for render) at an adjusted time 217 before the next clock update 118, 117 of the VSYNC unit 116 at time T8 203.

Figure 3:
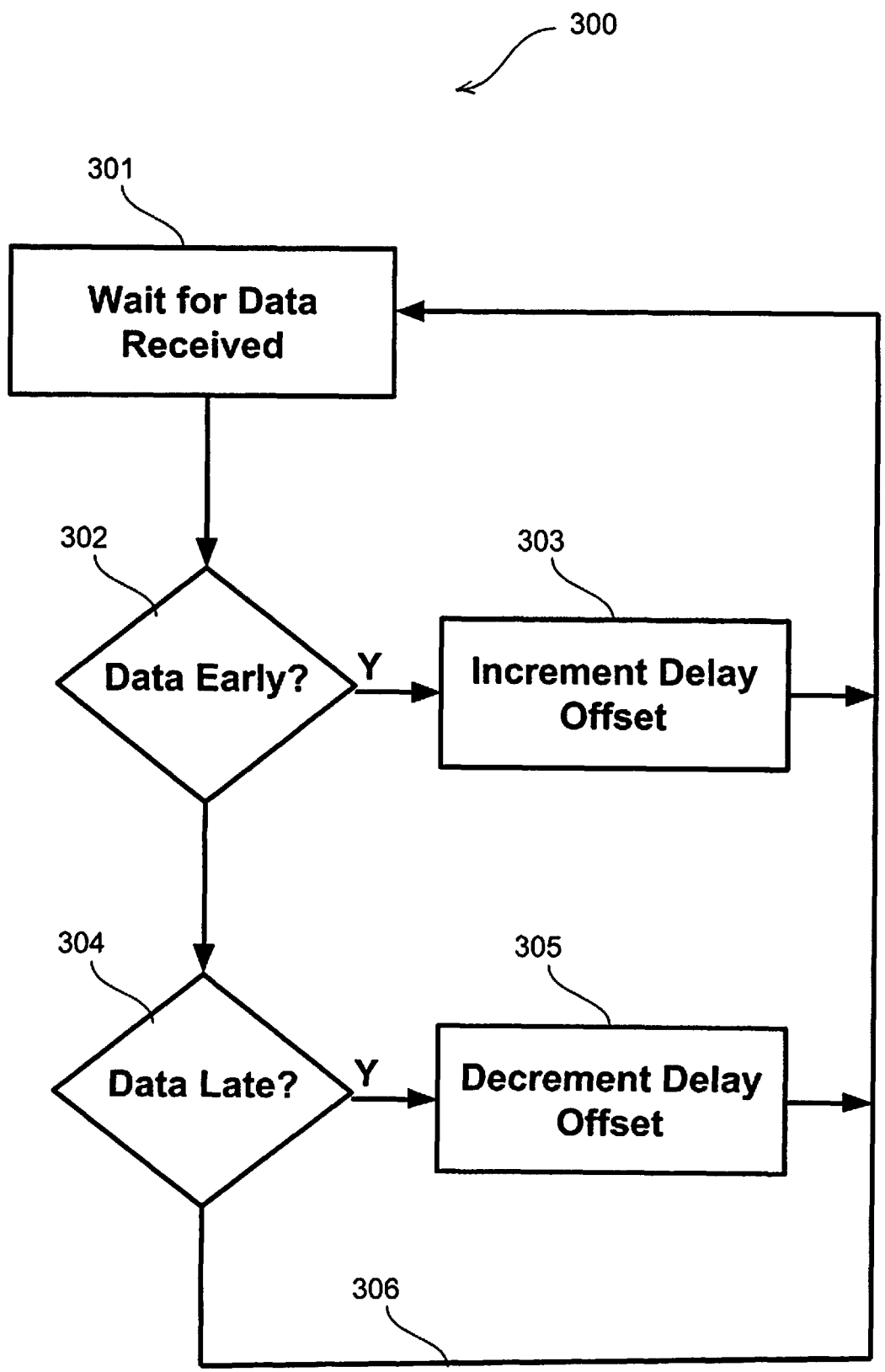
FIG. 3 illustrates operation of a user device of delay offset calculation, according to certain embodiments of the invention.

Referring to FIG. 3, a method 300 of operation of a device, such as the device 115, includes functionality to set the output 111 (i.e., the delay) of the delay unit 112 of communicated outgoing event 108 of the input device 114 of the user device 115 based on receiving processed data 109 and waiting 301 for that data by the user device 115. Upon receiving the processed data 109 if the receive time T6 213 is earlier 302 than the adjusted time 217, then the delay 112 output 111 is an incremented delay offset value 303 causing the event 108 to be sent later, so the processed data 109 (corresponding thereto) is received later. Upon receiving the processed data 109 if the receive time T6 213 is later 304 than the adjusted time 217, then the delay 112 output 111 is a decremented delay offset value 305 causing the event 108 to be sent earlier, so the processed data 109 (corresponding thereto) is received earlier. Upon receiving the Data 109 if the receive time T6 213 is approximately same as (or within some limited range of) the adjust time 217, then no change to output 111 of the delay 112 is performed 306. In operational implementations, the incrementing 303 and decrementing 305 may be averaged over multiple processed data 109 receptions by the user device 115 to compensate for network 107 latency variations.

Figure 4:
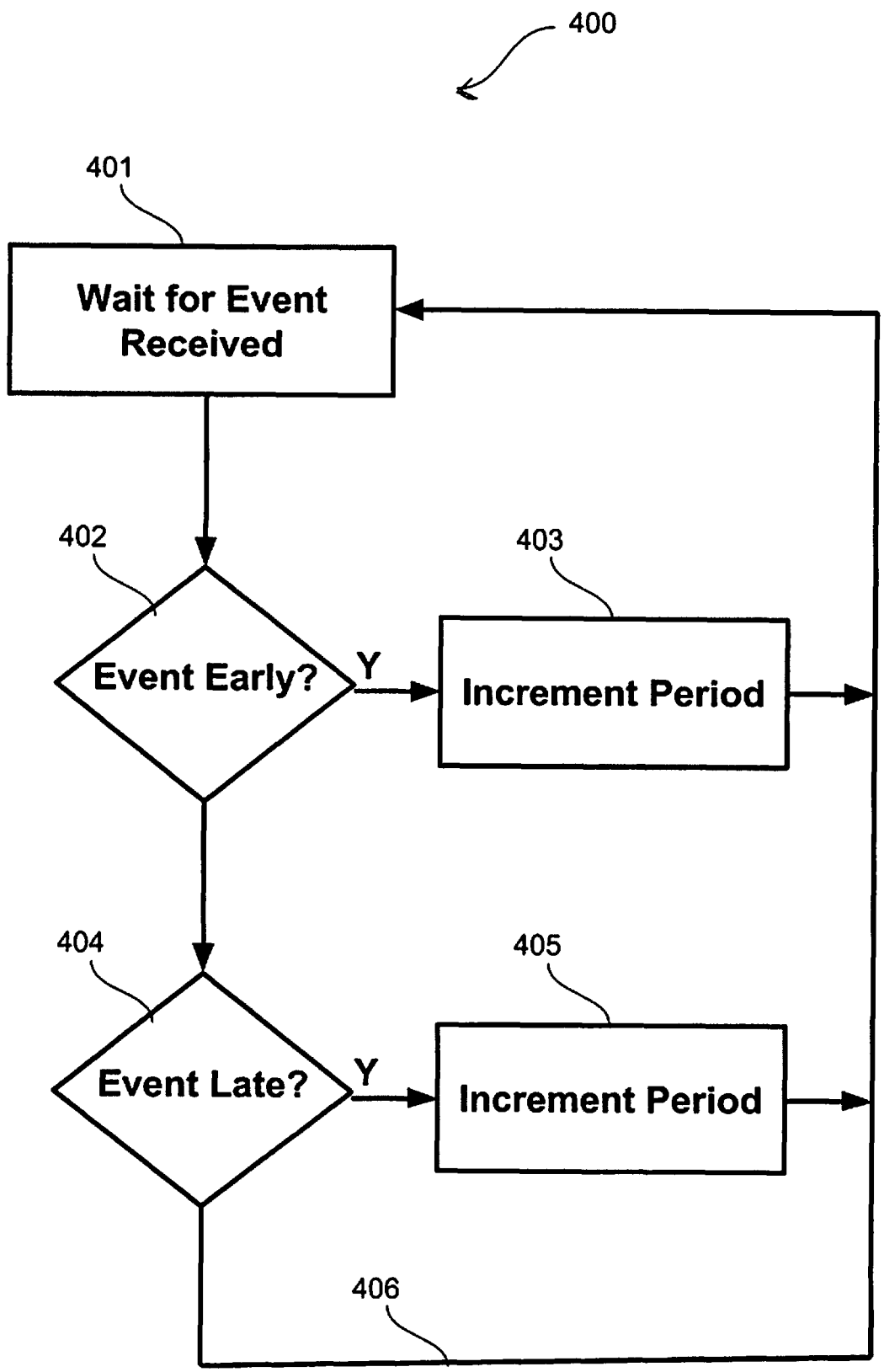
FIG. 4 illustrates operation of a processing device of frame time period VSYNC, according to certain embodiments of the invention.

Referring to FIG. 4, a method 400 of operation of a device, such as the processing device 101, includes functionality of the VSYNC unit 106 to create a periodic display update clock input 103 to the application unit 104 of the device 101, based on receiving an input event 102 over the network 107 from the user device 115 and waiting 401 by the device 101 for receiving that event 102. Upon receiving the event 102, if the time T3 207 is earlier than a desired variation of timing of the VSYNC unit 106 as VSYNC output 103 to the application unit 104 at time T4 209, then the period of VSYNC output 103 is incremented 403 at the processing device 101. Upon receiving the event 102, if the time T3 207 is later including a desired variation of VSYNC output 103 at time T4 209, then the period of VSYNC output 103 is decremented 405 at the processing device 101. Upon receiving the event 102, if the time T6 213 is approximately equal to including a desired variation of VSYNC output 103, then no change to VSYNC output 103 is performed 406 at the processing device 101. In operational implementations, the incrementing 403 and decremented 405 may be averaged over multiple event 102 receptions by the processing device 101 to compensate for network 107 latency variations.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
    a server computer;
    an application unit of the server computer;
    a user device communicatively connected to the server computer;
    an input device communicatively connected to the user device;
    a synchronizing frame rate generator of the user device;
    a delay (increment or decrement) unit of the user device connected to the synchronizing frame rate generator of the user device;
    a sampler of the user device connected to the delay (increment or decrement) unit, the sampler detects in increments input to the user device and couples the detected input to the output of the delay (increment or decrement) unit, to communicate with the server computer;
    a synchronizing frame rate generator of the server computer, time synced with the synchronizing frame rate generator of the user device;
    wherein the user device sends the server computer an event signal at a precise time, of the detected input of the sampler and the output of the delay (increment or decrement) unit, the server computer processes the application unit with the event signal as input, and the server computer returns processed data to the user device;
    wherein the processed data arrives at the user device at a correct time in sync with timing of the synchronizing frame rate generator of the user device, to be substantially immediately displayed by the user device.

2. The system of claim 1, wherein the user device includes a display for output of the processed data at the correct time.

3. The system of claim 1, wherein the user device includes a processor, memory, an input device and a display for output of the processed data at the correct time.

4. The system of claim 1, wherein the server computer includes a processor and memory.

5. The system of claim 1, wherein the synchronizing frame rate generator of the server computer is frequency locked to the synchronizing frame rate generator of the user device.

6. The system of claim 1, wherein the user device sends the event signal at a time delay from timing of the synchronizing frame rate generator of the user device as dictated by the delay (increment or decrement) unit.

7. The system of claim 6, wherein the delay (increment or decrement) unit enables the processed data from the server computer to arrive at the user device at the correct time of the synchronizing frame rate generator of the user device, to allow for the user device to substantially immediately render for display the processed data.

8. A method of operations of a display-server computing system, comprising:
    delivering an application input by a display device to a server computer over a communications network according to a delay unit associated with a timing of a synchronizing frame rate generator of the display device and an input of the display device;
    processing an application unit of the server computer with the application input and timing of a synchronizing frame rate generator of the server computer, responsive to delivering the application input;

outputting a result of the processing;

delivering the result by the server computer to the display device over the communications network;

receiving the result by the display device;

displaying the result substantially immediately at the timing of the synchronizing frame rate generator of the display device.

9. The method of claim 8, further comprising:

receiving the processed data by the display device from the server computer;

wherein upon receiving the processed data, if a receipt time is earlier than an adjusted time of the display device, the synchronizing frame rate generator of the display device causes the application input to be delayed by an increment.

10. The method of claim 8, further comprising:

receiving the processed data by the display device from the server computer;

wherein upon receiving the processed data, if a receipt time is later than an adjusted time of the display device, the synchronizing frame rate generator of the display device causes the application input to be speeded by a decrement.

11. The method of claim 8, further comprising:

receiving the processed data by the display device from the server computer;

wherein upon receiving the processed data, if a receipt time is about same as an adjusted time of the display device, the synchronizing frame rate generator of the display device does not affect the application input.

12. The method of claim 8, further comprising:

receiving the application input by the server computer from the display device;

wherein upon receiving the application input, if a receipt time is earlier than an adjusted time of the server computer, the synchronizing frame rate generator of the server computer increments a timing signal to the application unit.

13. The method of claim 8, further comprising:

receiving the application input by the server computer from the display device;

wherein upon receiving the application input, if a receipt time is later than an adjusted time of the server computer, the synchronizing frame rate generator of the server computer decrements a timing signal to the application unit.

14. The method of claim 8, further comprising:

receiving the application input by the server computer from the display device;

wherein upon receiving the application input, if a receipt time is about same as an adjusted time of the server computer, the synchronizing frame rate generator of the server computer does not affect a timing signal to the application unit.

* * * * *